United States Patent [19]
Yang

[11] Patent Number: 6,023,419
[45] Date of Patent: Feb. 8, 2000

[54] CAPACITOR REGULATED CONTROLLABLE VOLTAGE AND CURRENT POWER SUPPLY

[76] Inventor: Tai-Her Yang, No. 32 Lane 29, Taipin St., Si-Hu Town, Dzan-Hwa, Taiwan

[21] Appl. No.: 08/986,746

[22] Filed: Dec. 8, 1997

[51] Int. Cl.[7] .................................................. H02M 5/42
[52] U.S. Cl. ............................ 363/86; 363/81; 323/281
[58] Field of Search .............................. 383/89; 323/222; 363/89, 44, 45, 46, 86, 81, 83

[56] References Cited

U.S. PATENT DOCUMENTS 4,635,176  1/1987  Hishiki et al. ............................ 363/21
5,721,675  2/1998  Lee ............................................ 363/44

*Primary Examiner*—Shawn Riley
*Attorney, Agent, or Firm*—Bacon & Thomas

[57] ABSTRACT

The active capacitor regulating type controllable voltage and current power supply circuit is disclosed with a voltage reducing and current limiting rectifying circuit which is constituted by capacitors and a bridge type current rectifier device, wherein it is characterized in that the output terminals of the rectifying circuit are parallel installed with a current distributing circuit device, thereby to actively control the output voltage setting status.

19 Claims, 10 Drawing Sheets

CAPACITOR REGULATED CONTROLLABLE VOLTAGE AND CURRENT POWER SUPPLY

BACKGROUND AND SUMMARY OF THE INVENTION

Most conventional DC power supply circuits reduce voltage by using transformers. The power supply circuit of the invention, in contrast, uses a capacitor as the voltage reducing component and a bridge type current rectifier device for converting AC current to DC current resulting in a power supply having a smaller volume, lower weight, and lower cost.

While high frequency carrier wave controlled switching type power supply circuits have a similar volume and weight, capacitor abased circuits have less heat loss and lower cost than such switching type power supplies, and in addition eliminate noise interference (EMC). Therefore, application of this type of power supply has gradually expanded from low power applications to medium and large power applications.

Because the effect of using a capacitor as a voltage reducing component is essentially the same as using the conventional series-combined resistors, i.e., the output terminal voltage is inversely related to the output current, control of the capacitor-based power supply circuit is as follows: when the output current is increased, the output terminal voltage is reduced, while when the output current is decreased, the output terminal voltage will be raised. In addition, the capacitor regulated circuit can be further installed with a controllable current distributing circuit device parallel connected with the output terminals of the current rectifier device to actively control the output voltage.

It is thus an objective of the invention to provide an improved voltage and current power supply circuit made up of a voltage reducing and current limiting rectifying circuit formed by capacitors and a bridge type current rectifier device. The output terminals of the rectifying circuit are parallel connected to a current distributing circuit device which controls the output voltage.

DETAILED DESCRIPTION OF THE INVENTION

Figure 1:
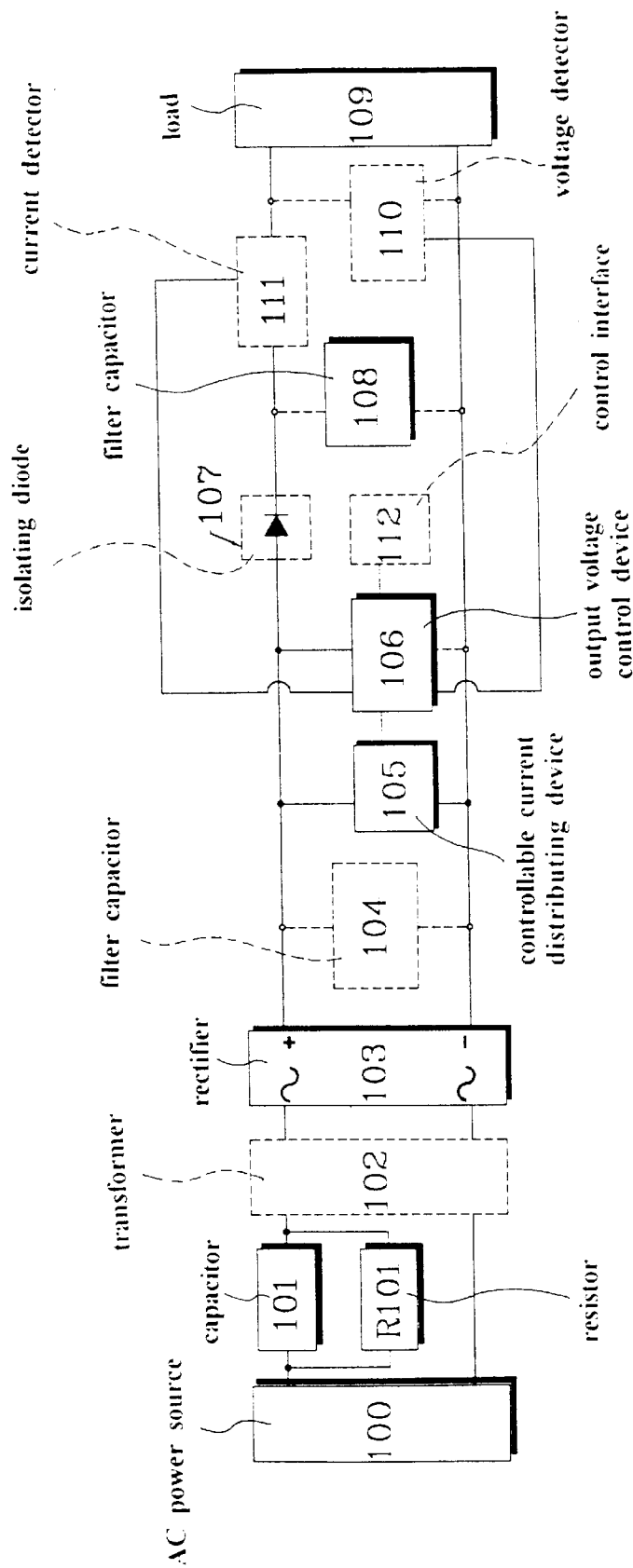
FIG. 1 is a schematic circuit diagram of the invention.

FIG. 1 is a schematic circuit diagram of a power supply circuit which controls voltage and current through regulation of the capacitor. AC power source 100 is a single phase or multiple phase power source, which may be provided by a public power supply system or from the secondary AC power source of transformer.

The capacitor 101 is any kind of capacitor suitable for application with AC power. It can be directly series connected between the AC power source 100 and the current rectifier device 103, between the AC power source 100 and the primary terminals of transformer 102, or between the secondary terminals of transformer 102 and current rectifier device 103. The two end terminals of capacitor 101 can be further parallel connected to a by-pass resistor R101.

The transformer 102 is installed between the AC power source 100 and current rectifier device 103 for changing the voltage value of the AC power source 100. Transformer 102 is comprised of an isolated type structure with primary and secondary isolated windings or has a self-coupled transformer structure with self-coupled windings. Its secondary output windings can be a three-terminal type secondary winding with intermediate taps or a two-terminal type secondary winding. The transformer 102 is an optional device which can be installed if required by the circuit. The capacitor 101 can be series connected between the primary terminals or secondary terminals of the transformer 102, or the transformer 102 can be omitted, while the AC power source 100 and the capacitor 101 are directly series connected before providing input to the current rectifier device 103.

The current rectifier device 103 is a full wave bridge type current rectifier device comprised of solid state rectifiers for converting input AC power into full wave DC output.

An optional first filter capacitor 104 is parallel combined between the output positive and negative terminals of the current rectifier device 103 to reduce voltage pulsation.

A controllable current distributing device 105 includes linear, switching type solid state, electromechanical components, or thyristors, and is parallel connected between the output terminals of the current rectifier device 103 to maintain a stable output voltage by generating a linear or switching type current at load decrease or output voltage increase of the current rectifier 103 due to rising power source terminal voltage.

An output voltage control device 106 includes electromechanical or solid state components for controlling the operating status of the controllable current distributing device 105. The device 106 controls the output terminal voltage of the capacitor regulated controllable voltage and current power supply circuit. The device 106 is comprised of: 1) a current limiting resistor R110 and zener diode ZD110 series connected and parallel connected between the power source and control terminal of the controllable current distributing device, thereby forming a voltage output control device with a fixed bias; 2) fixed voltage distributing resistors R111, R112 parallel connected between the two terminals of power source, and a zener diode ZD110 optionally series connected between its intermediate terminal and the controllable current distributing device, thereby forming a voltage output control device with a proportional bias; 3) a variable resistor VR110 optionally parallel connected between the two terminals of power source, and a zener diode ZD110 optionally series connected between the output terminal of the variable resistor and the controllable current distributing device, thereby forming a voltage output control device with a controllable bias; 4) the voltage output control device comprising the pulse-width modulation functioning output voltage control device CL110 used to perform PWM control the controllable current distributing device; and 5) a voltage output control device formed by a phase angle triggering modulation circuit.

An isolating diode 107 is series connected between the power source output terminal leading to the second filter capacitor 108 and further to the load 109, thereby preventing the accumulated power at the second filter capacitor 108 from flowing back to the power source. The isolating diode 107 can be selected to be installed or not installed according to circuit requirements.

An optional second filter capacitor 108 is parallel connected between the circuit output terminals leading to the load for further reducing the voltage pulsation.

A load 109 is either a resistive load, a resistive and inductive mixing type load, a rechargeable and accumulative type load, or a rotational electrical machine type load for matching with the capacitor regulated controllable voltage and current power supply circuit.

The capacitor regulated controllable voltage and current power supply circuit can be installed with various type overload or short circuit protecting components such as a fuse, circuit breaker and various surge voltage absorbing protective components as well as various noise absorbing components.

An optional load terminal voltage detector device 110 is coupled between the two terminals of load 109 for transferring the detected voltage feedback signal to the output voltage control device 106, thereby providing a voltage feedback control function on the controllable current distributing device. The optional load terminal voltage detector device is comprised of electromechanical or solid state circuit components.

An optional load current detector device 111 is series connected between the load 109 and the power source for transferring detected current signal to the voltage output control device 106, thereby providing a current feedback control function on controllable current distributing device 105. The optional load current detector device 111 is comprised of electromechanical or solid state circuit components.

An optional control interface 112 is a manual or electromechanical signal control interface which includes electromechanical or solid state circuit components for controlling the voltage output control device 106 and controllable current distributing device 105. The optional interface 112 can be selected to be installed or not installed according to system requirements.

FIG. 1 shows a first embodiment of the present invention as including a circuit structure to which different circuit components and function selections can be added or omitted. The circuit can be divided into a front section, which is a circuit that rectifies current from AC input to full wave rectified current output, and a rear section output circuit, which outputs full wave DC power to the load. The various embodiments of the front section current rectifying circuit and the rear section output circuit are respectively described below.

The specific front section current rectifying circuit embodiment derived from FIG. 1 depends on whether the transformer is selected. If a transformer is selected, the transformer secondary winding outputs to a matching full wave current rectifier device, and the series connected positions of the capacitor are also selected.

Figure 2:
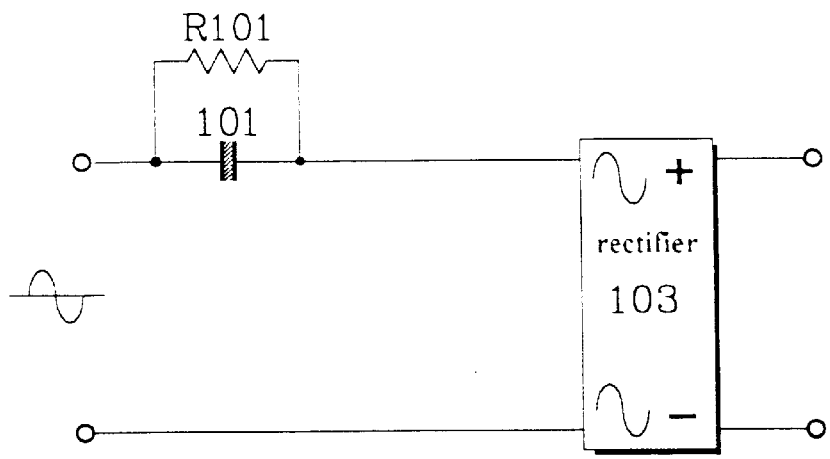
FIG. 2 is a schematic circuit diagram of the invention illustrating a capacitor that is series combined with the AC input terminal of a full wave current rectifier device.

FIG. 2 is a schematic circuit diagram which shows a second preferred embodiment of the present invention that includes the capacitor 101 connected in series with the AC input terminal of the full wave current rectifier device 103. FIG. 2 is a schematic circuit diagram of the capacitor regulated controllable voltage and current power supply circuit, illustrating a capacitor directly series connected to the AC input terminal of the full wave current rectifier device.

Figure 3:
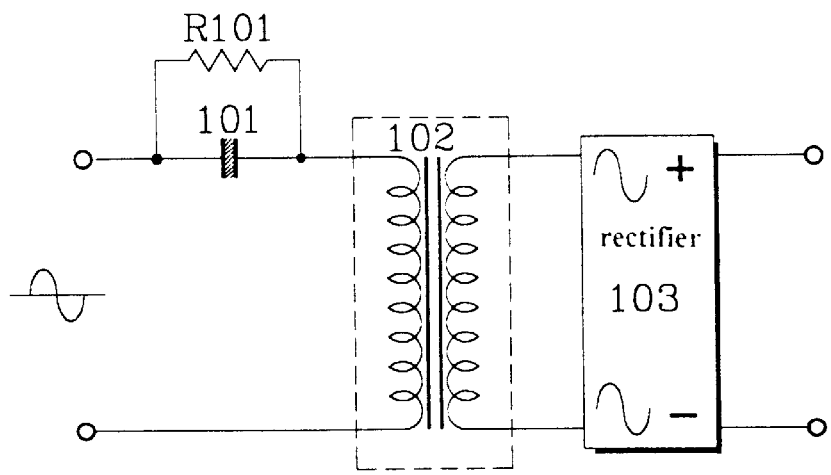
FIG. 3 is a schematic circuit diagram of the invention illustrating a capacitor that is series connected to the primary winding of a transformer and through the secondary winding of the transformer to provide an output to the full wave current rectifier device.

FIG. 3 is a schematic circuit diagram which shows a third preferred embodiment of the present invention that includes the capacitor 101 connected in series to the primary windings of transformer 102 and connected through the secondary windings of transformer 102 to transfer output to the full wave current rectifier device 103. FIG. 3 illustrates a capacitor series connected to the primary winding of a transformer so that the circuit provides output to the full wave current rectifier device through the secondary winding of the transformer.

Figure 4:
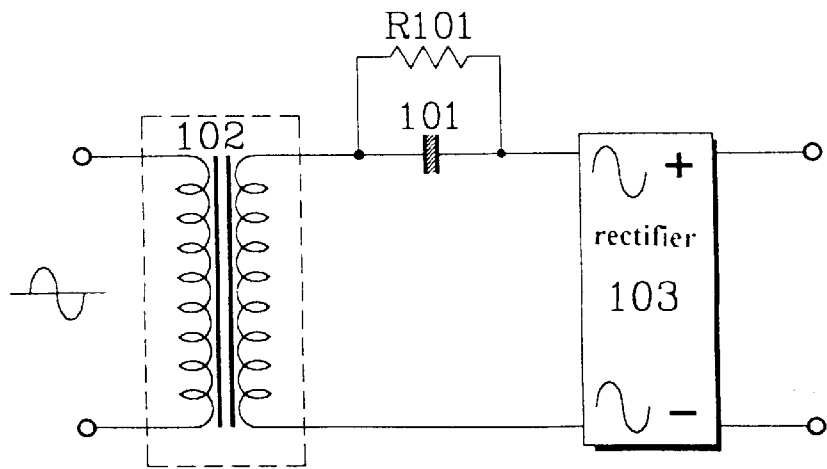
FIG. 4 is a schematic circuit diagram of the invention illustrating a capacitor that is series connected between the secondary winding of a transformer and the current rectifier device.

FIG. 4 is a schematic circuit diagram which shows a fourth preferred embodiment of the present invention that includes the capacitor 101, which is connected in series between the secondary winding of the transformer 102 and the current rectifier device 103.

Figure 5:
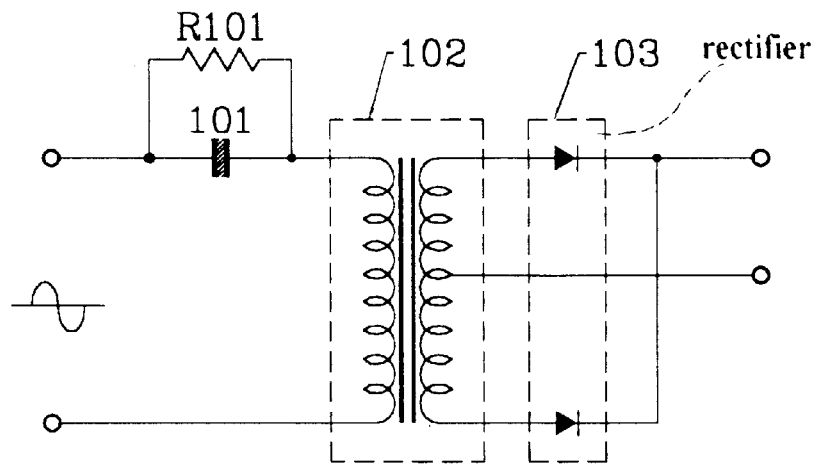
FIG. 5 is a schematic circuit diagram of the invention illustrating a capacitor that is series connected with the primary winding of a transformer and the secondary winding of the transformer with intermediate taps and two diodes form a full wave current rectifier circuit.

FIG. 5 is a schematic circuit diagram which shows a fifth preferred embodiment of the present invention that includes the capacitor 101 connected in series with the primary winding of the transformer 102, so that the secondary winding of the transformer 102 with intermediate taps and two diodes constitute a full wave current rectifier circuit.

Figure 6:
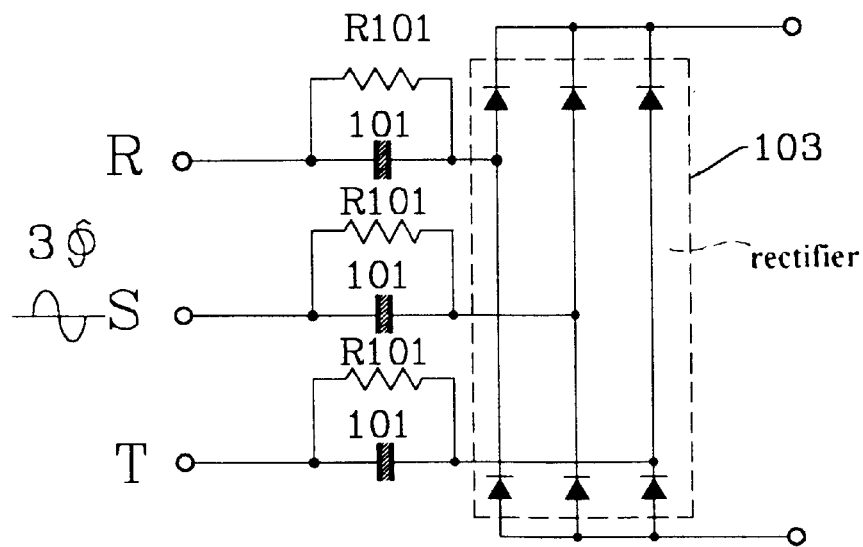
FIG. 6 is a schematic circuit diagram of the invention illustrating three capacitors are each respectively series combined between a three phase AC power source and a three phase full wave current rectifier device.

FIG. 6 is a schematic circuit diagram which shows a sixth preferred embodiment of the present invention that includes three capacitors 101, each respectively connected in series between the three phase AC power source and the three phase full wave current rectifier device 103. FIG. 6 illustrates three capacitors each respectively series connected between the three phase AC power source and the three phase full wave current rectifier device.

Figure 7:
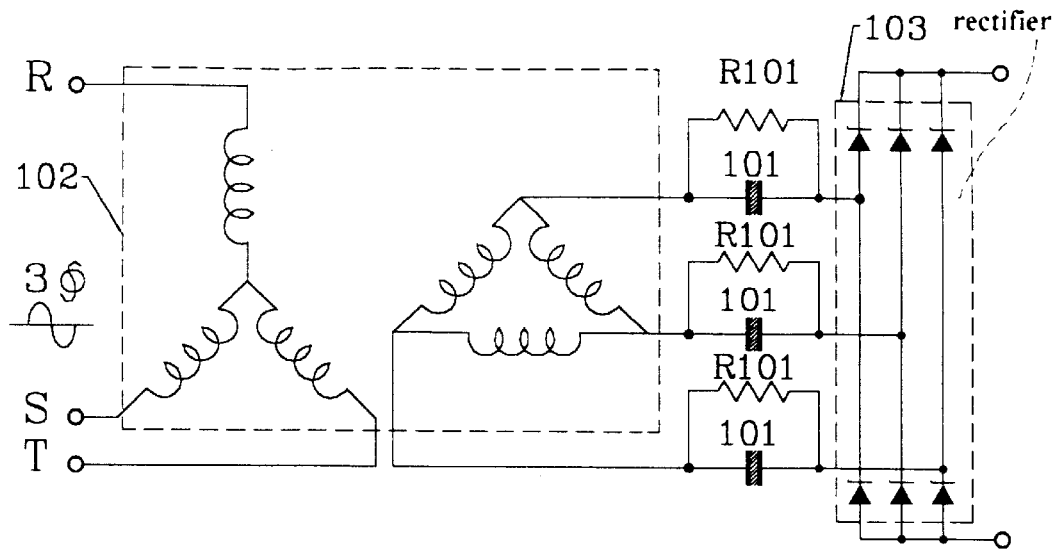
FIG. 7 is a schematic circuit diagram of the invention illustrating three capacitors each respectively series combined between the secondary winding of a three phase transformer and a three phase full wave current rectifier device.

FIG. 7 is a schematic circuit diagram which shows a seventh preferred embodiment of the present invention that includes the AC power source that transfers output to the three phase transformer 102, so that three capacitors 101 are each respectively connected in series between the secondary winding of the three phase transformer 102 and the three phase full wave current rectifier device 103.

Figure 8:
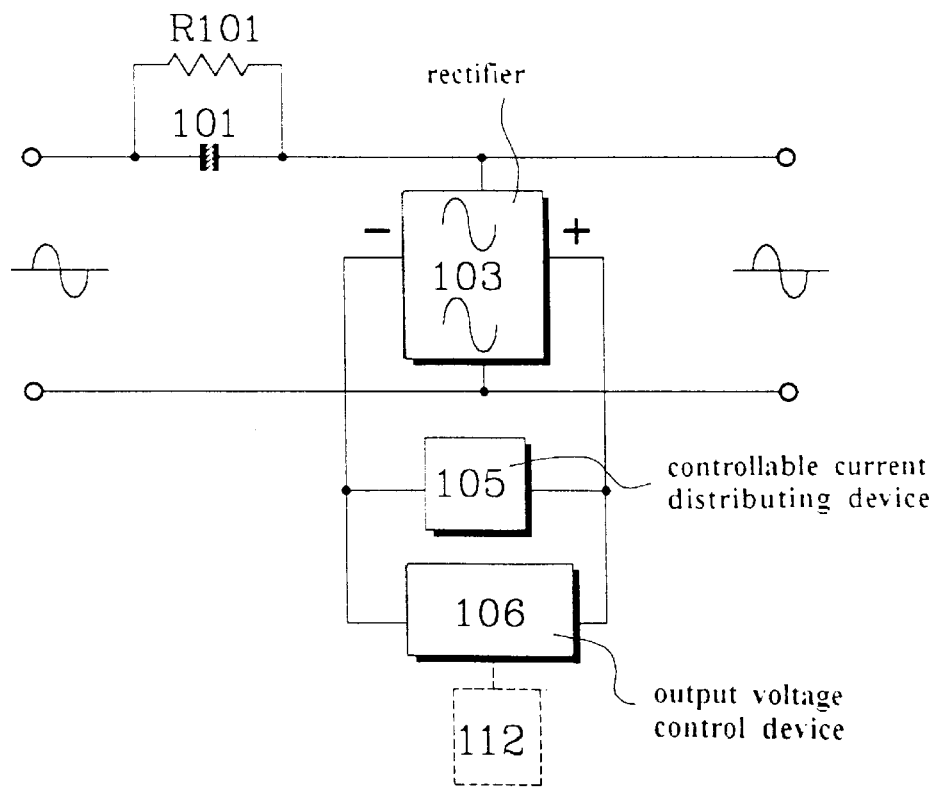
FIG. 8 is a schematic circuit diagram of the invention illustrating a capacitor series connected between a single phase power source and a load, while the AC terminals of the full current bridge type current rectifier are parallel connected with the two AC output terminals.

FIG. 8 is a schematic circuit diagram which shows an eighth preferred embodiment of the present invention that includes the capacitor 101 connected in series between the single phase power source 100 and the load 109, while the AC terminals of the full current bridge type current rectifier 103 are parallel connected to the two AC output terminals. The positive and negative terminals of the current rectifier device 103 are parallel connected in current direction with the controllable current distributing device 105 and the output terminals can be selectively series connected to a load current detector device 111 or parallel connected to a load voltage detector device 110 for detecting the relative current or voltage, thereby controlling the output voltage control device 106 and modulating the AC output voltage or current. FIG. 8 illustrates a capacitor series connected between the single phase power source and the load, while the AC terminals of the full current bridge type current rectifier are parallel connected to the two AC output terminals.

Figure 9:
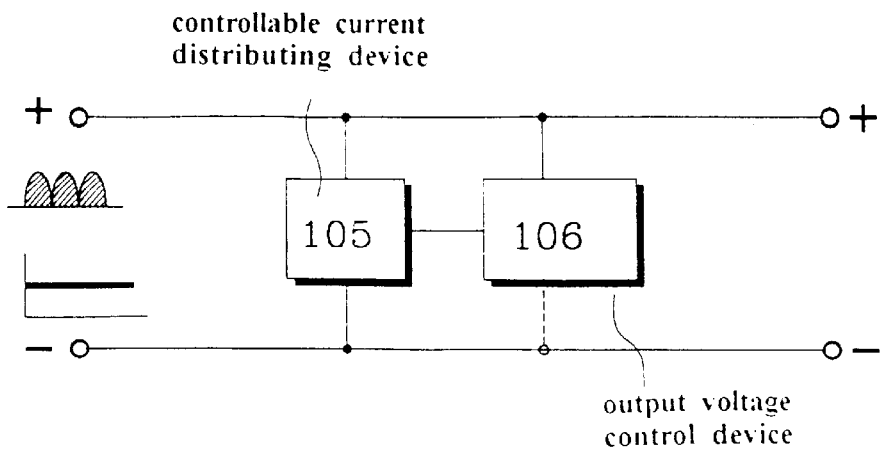
FIG. 9 is a schematic circuit diagram of the invention illustrating the front section DC output terminals directly parallel combined with a controllable current distributing device.

Through matching with circuit components as well as function omissions and additions, the rear section output circuit of the embodiment illustrated in FIG. 1 may be varied as follows, depending on the application:

FIG. 9 is a schematic circuit diagram which shows a ninth preferred embodiment of the present invention that includes the full wave rectified DC output terminals directly parallel connected to a controllable current distributing device 105, which is comprised of linear or switching type solid state or electromechanical components or thyristors, for accepting control by the voltage output control device 106. In addition, the aforesaid circuit can be series connected to a diode 107 in the current direction between the controllable current distributing device 105 and the output voltage control device, and a second filter capacitor 108 can be selectively parallel connected between the output terminals, as required. FIG. 9 illustrates DC output terminals of the front section of the circuit directly parallel connected to a controllable current distributing device.

Figure 10:
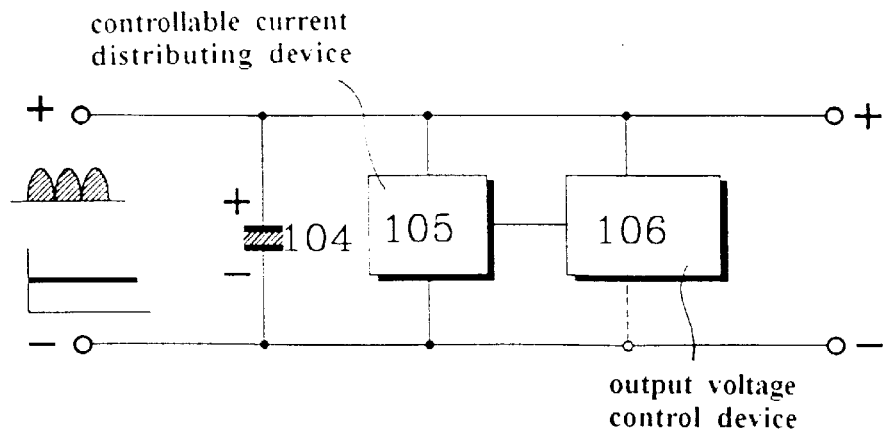
FIG. 10 is a schematic circuit diagram of the invention illustrating DC output terminals first parallel combined with a filter capacitor and then parallel combined with a controllable current distributing device.

FIG. 10 is a schematic circuit diagram which shows a tenth preferred embodiment of the present invention that includes the full wave rectified DC output terminals, which are first parallel connected to the first filter capacitor 104, and then parallel connected to a controllable current distributing device 105, which is comprised of linear or switching type solid state or electromechanical components or thyristors for accepting control by the voltage output control device 106. In addition, the aforesaid circuit can be series connected with a diode 107 in the current direction between the controllable current distributing device 105 and the output voltage control device. A second filter capacitor 108 can be selectively parallel connected between output terminals as required. FIG. 10 illustrates DC output terminals first parallel connected to filter capacitor and then parallel connected to a controllable current distributing device.

Figure 11:
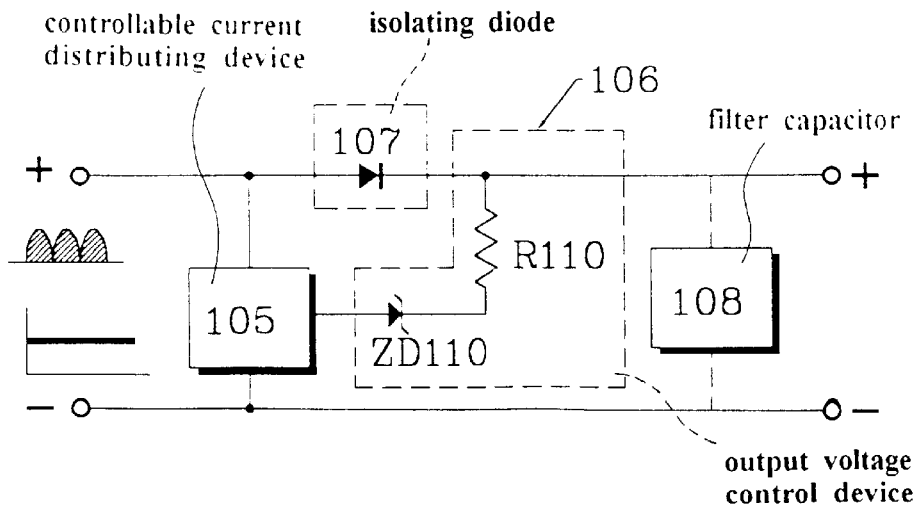
FIG. 11 is a schematic circuit diagram of the invention illustrating a controllable current distributing device including linear or switching type solid state controllable current distributing components or electromechanical components controlled by a voltage output control device with fixed bias.

FIG. 11 is a schematic circuit diagram which shows an eleventh preferred embodiment of the present invention that includes the controllable current distributing device 105 which includes linear or switching type solid state controllable current distributing components or electromechanical components controlled by a voltage output control device 106 with fixed bias. The fixed bias is obtained from the series connected zener diode ZD101 (including the further series installed current limiting resistor R110). In addition, the aforesaid circuit can be series connected to a diode 107 in the current direction between the controllable current distributing device 105, and the output voltage control device as well as a second filter capacitor 108 can be selectively parallel connected between the output terminals as required. FIG. 11 illustrates a controllable current distributing device comprising of linear or switching type solid state controllable current distributing components or electromechanical components controlled by a voltage output control device with a fixed bias.

Figure 12:
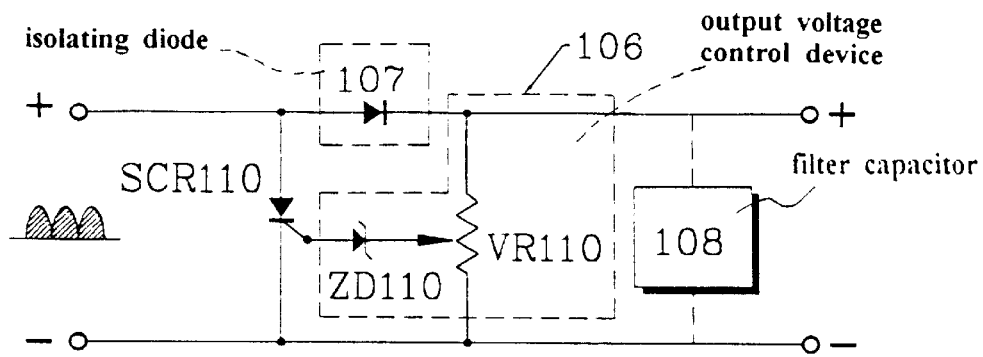
FIG. 12 is a schematic circuit diagram of the invention illustrating a controllable current distributing device including thyristors controlled by a voltage output control device with controllable voltage output.

FIG. 12 is a schematic circuit diagram which shows a twelfth preferred embodiment of the present invention that includes the controllable current distributing device 105 comprised of thyristor SCR110 controlled by a variable resistor VR110, wherein the controllable voltage bias is obtained by the variable resistor VR110 and the series connected zener diode ZD110 with its output terminals. In addition, the aforesaid circuit can be series connected to a diode 107 in the current direction between the controllable current distributing device 105 and the output voltage control device, and a second filter capacitor 108 can be selectively parallel installed between the output terminals as required. FIG. 12 illustrates a controllable current distributing device including thyristors controlled by a voltage output control device with controllable voltage output.

Figure 13:
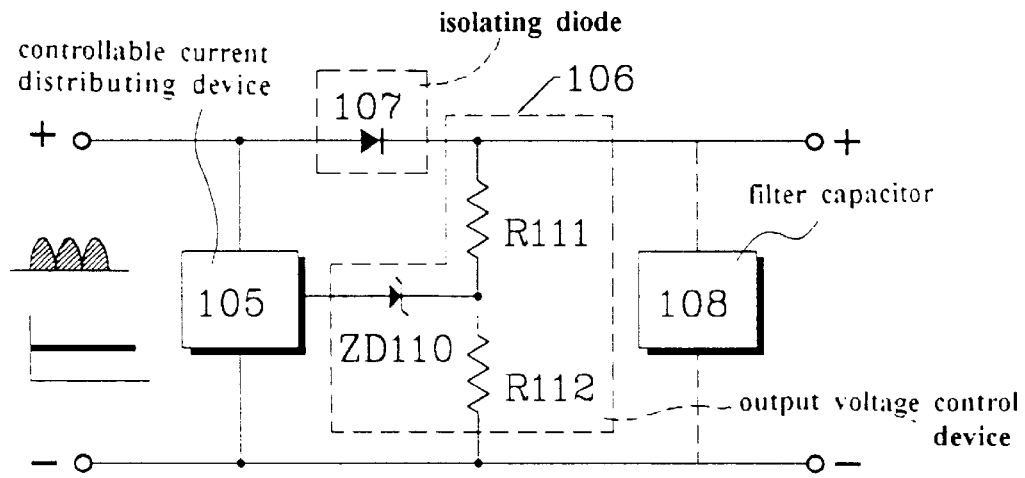
FIG. 13 is a schematic circuit diagram of the invention illustrating a proportional bias voltage circuit formed by voltage distributing resistors and a zener diode which is series combined between the power source and control terminal of the controllable current distributing device.

FIG. 13 is a schematic circuit diagram which shows a thirteenth preferred embodiment of the present invention that includes the voltage output control device 106, which includes a zener diode ZD110 connected in series between the intermediate terminal of the voltage distributing resistors R111 and R112, which is parallel connected between the two power source terminals and the control terminal of the controllable current distributing device 105, thereby providing a proportional voltage bias for controlling the controllable current distributing device 105, which is comprised of linear or switching type solid state or electromechanical components or thyristor SCR110. The aforesaid voltage distributing resistor includes other voltage setting permissible circuits. For example, the aforesaid circuit can be series connected to a diode 107 in the current direction between the controllable current distributing device 105 and the output voltage control device, and a second filter capacitor 108 can be selectively parallel between the output terminals, as required. FIG. 13 illustrates a proportional bias voltage circuit including the voltage distributing resistors and the zener diode, which is series connected between the power source and control terminals of the controllable current distributing device.

Figure 14:
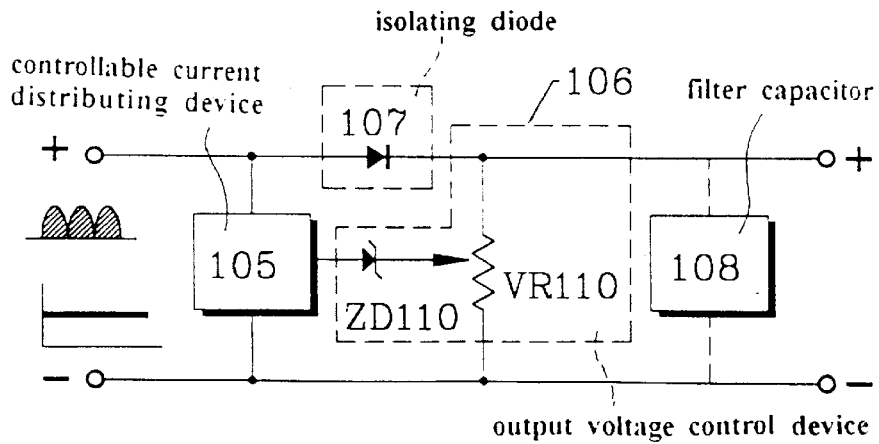
FIG. 14 is a schematic circuit diagram of the invention illustrating a controllable current distributing device controlled by a voltage output control device with adjustable and setting permissive bias.

FIG. 14 is a schematic circuit diagram which shows a fourteenth preferred embodiment of the present invention that includes the voltage output control device 106, which includes a zener diode ZD110 connected in series between the output terminal of the variable resistor VR110, which is parallel connected between the two power source terminals and the input terminal of the controllable current distributing device 105, thereby providing a fixed voltage bias for controlling the controllable current distributing device 105, which is comprised of linear or switching type solid state or electromechanical components or thyristors. The aforesaid circuit can be series connected to a diode 107 in the current direction between the controllable current distributing device 105 and the output voltage control device, and a second filter capacitor 108 can be selectively parallel connected between the output terminals, as required. FIG. 14 illustrates a controllable current distributing device controlled by a voltage output control device with adjustable and setting permissive bias.

Figure 15:
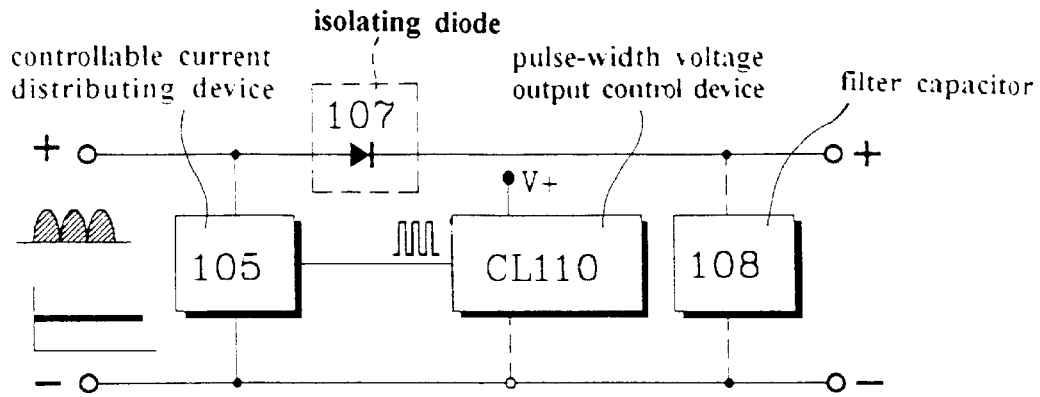
FIG. 15 is a schematic circuit diagram of the invention illustrating a controllable current distributing device controlled by a pulse-width modulation functioning voltage output control device for pulse-width modulation voltage output control.

FIG. 15 is a schematic circuit diagram which shows a fifteenth preferred embodiment of the present invention that includes the controllable current distributing device 105 which includes linear or switching type solid state or electromechanical components or thyristors. The device 105 is controlled by the output voltage control device 106, which is further controlled by the pulse-width modulation functioning voltage output control device CL110 for pulse-width modulation (PWM) control. The aforesaid circuit can be series connected with a diode 107 in the current direction between the controllable current distributing device 105 and the output voltage control device, and a second filter capacitor 108 can be selectively parallel connected between the output terminals, as required. FIG. 15 illustrates a controllable current distributing device controlled by the pulse-width modulation functioning voltage output control device for pulse-width modulation voltage output control.

Figure 16:
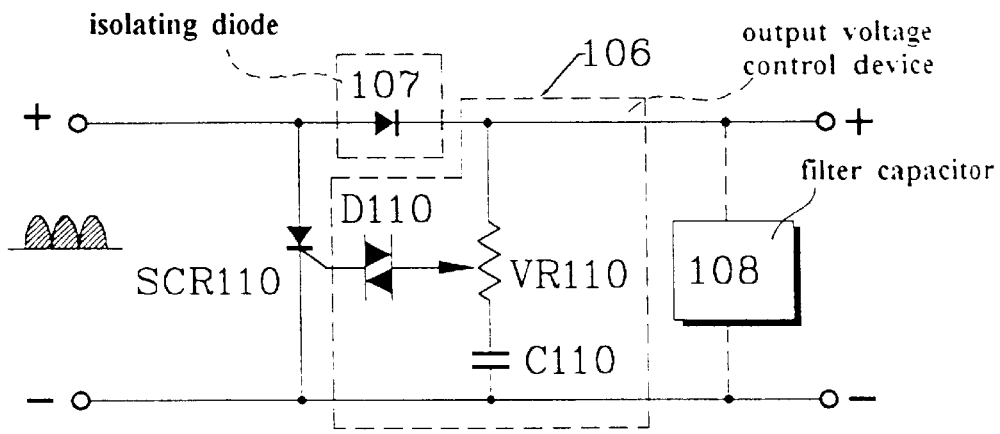
FIG. 16 is a schematic circuit diagram of the invention illustrating a controllable current distributing device including thyristors controlled by a phase angle triggering modulation output voltage control device.

FIG. 16 is a schematic circuit diagram which shows a sixteenth preferred embodiment of the present invention that includes the controllable current distributing device 105, which includes thyristors. The device 105 can be controlled by a phase angle triggering modulation output voltage control device 106 constituted by the variable resistor VR111, phase shifting capacitor C110, and triggering diode D110, and the aforesaid circuit can be series connected to a diode 107 in the current direction between the controllable current distributing device 105 and the output voltage control device. A second filter capacitor 108 can be selectively parallel connected between the output terminals, as required. FIG. 16 illustrates a controllable current distributing device comprised of thyristors controlled by a phase angle triggering modulation output voltage control device.

Figure 17:
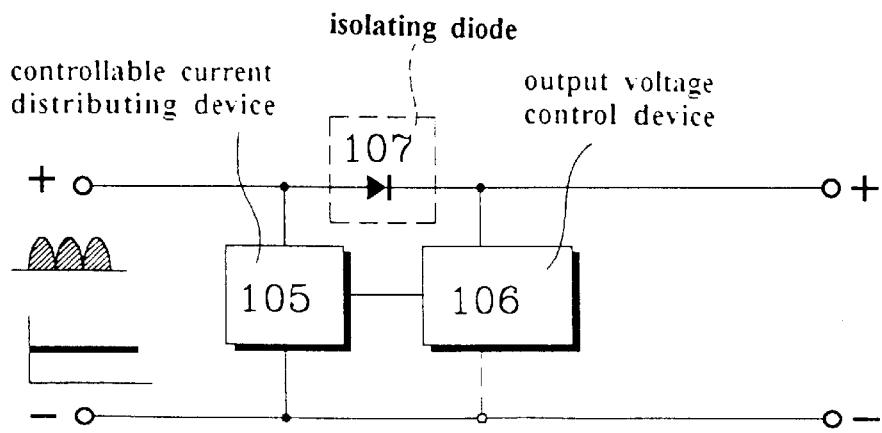
FIG. 17 is a schematic circuit diagram of the invention having output terminals series combined with an isolating diode in the current direction.

FIG. 17 is a schematic circuit diagram which shows the seventeenth preferred embodiment of the present invention that includes the DC power source, which is parallel connected to the controllable current distributing device 105. The device 105 is series connected to a isolating diode 107 in current direction thereby connecting the output voltage control device 106 and the load.

Figure 18:
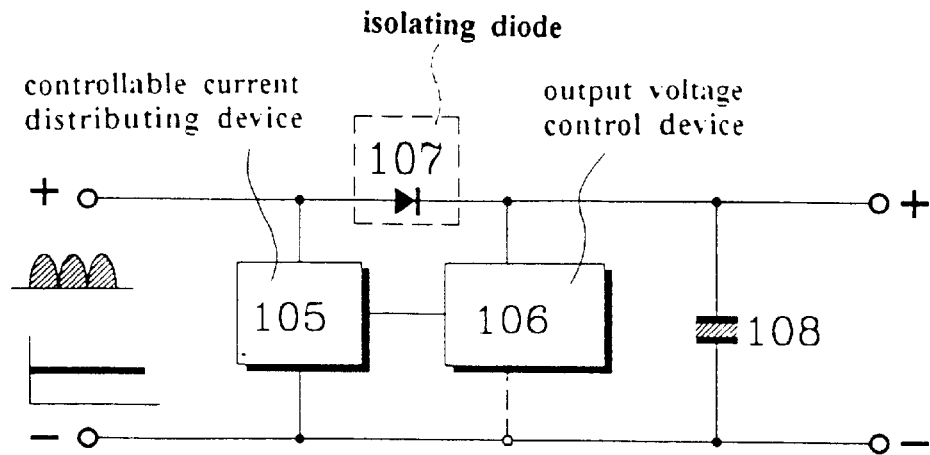
FIG. 18 is a schematic circuit diagram of the invention illustrating output terminals parallel combined with a wave filter capacitor.

FIG. 18 is a schematic circuit diagram which shows an eighteenth preferred embodiment of the present invention that includes the DC power source, which is parallel connected to the controllable current distributing device 105. The device 105 is series connected to an isolating diode 107 in current direction, to parallel connected to the output voltage control device 106 and further parallel connected to the second filter capacitor 108 connected to the load.

In actual use, the output circuit of the capacitor regulated controllable voltage and current power supply circuit is a combination of the aforesaid respective functional circuits described in embodiments 2–8 and 10–18. For example, its output terminals are for driving the resistive type or mixed resistive and inductive type of rechargeable battery type DC loads.

Figure 19:
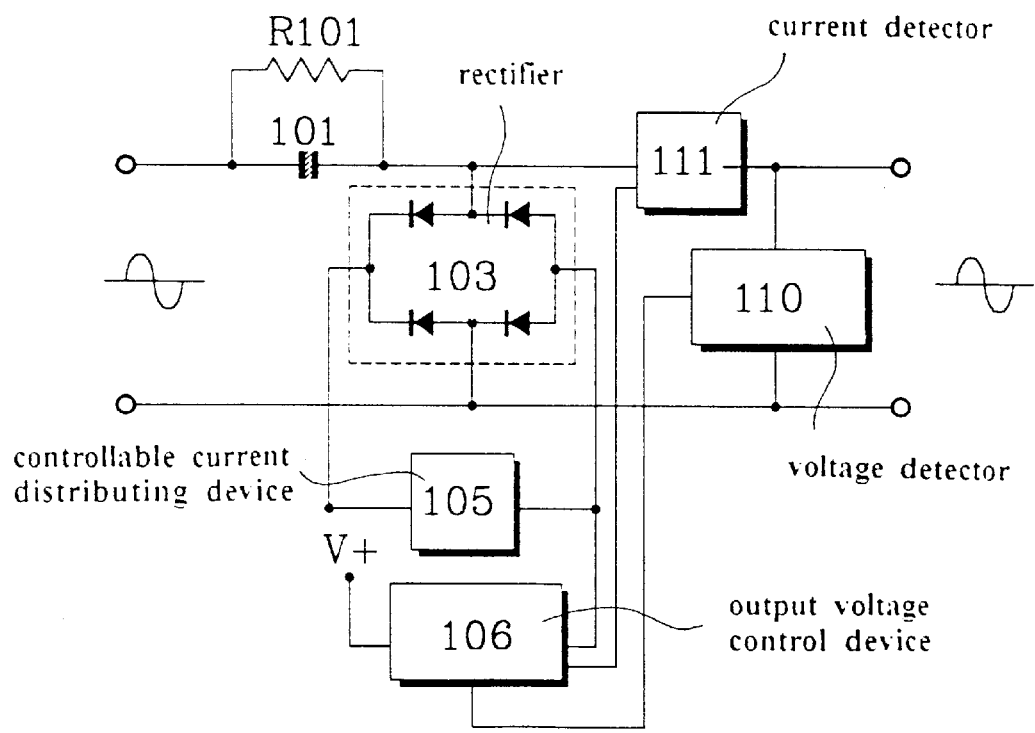
FIG. 19 is a schematic circuit diagram of the invention illustrating a capacitor series connected between a single phase AC current power source and a load, and two AC power output terminals leading to the load are parallel combined with a full wave current rectifier device and a controllable current distributing device.

FIG. 19 is a schematic circuit diagram which shows a nineteenth preferred embodiment of the present invention that includes the capacitor 101 directly series connected between the single phase AC power source 100 and the load 109. The two AC power output terminals leading to the load 109 are parallel connected to a full wave current rectifier device 103, and the positive and negative output terminals of the full wave current rectifier device 103 are further parallel connected to a controllable current distributing device 105, which includes solid state linear or switching solid state controllable current distributing components connected in the polar direction. The output terminals can be selectively series connected to a load current detector device 111 or parallel connected to a load terminal voltage detector device 110, for detecting the relative current or voltage, thereby controlling the output voltage control device 106 and modulating the AC output voltage or current. FIG. 19 illustrates a capacitor series connected between the single phase AC current power source and the load, while the two AC power output terminals leading to the load are parallel connected to a full wave current rectifier device and a controllable current distributing device.

The rear section output circuit of the capacitor regulated controllable voltage and current power supply circuit can be further defined by rearranging the multi-level series combination type controllable current distributing device to constitute a multiple voltage output circuit. The multi-level series combination type controllable current distributing circuit includes two or more than two linear or switching type solid state or electromechanical components or thyristors which are first combined in series and are then parallel connected to the output terminals of the front section power source. Each controllable current distributing circuit is individually connected to its matching output control device for its individual control. The two terminals of the power source and the series connecting point of each controllable current distributing component commonly constitute the multiple voltage terminals thereby individually providing output to drive the load.

Figure 20:
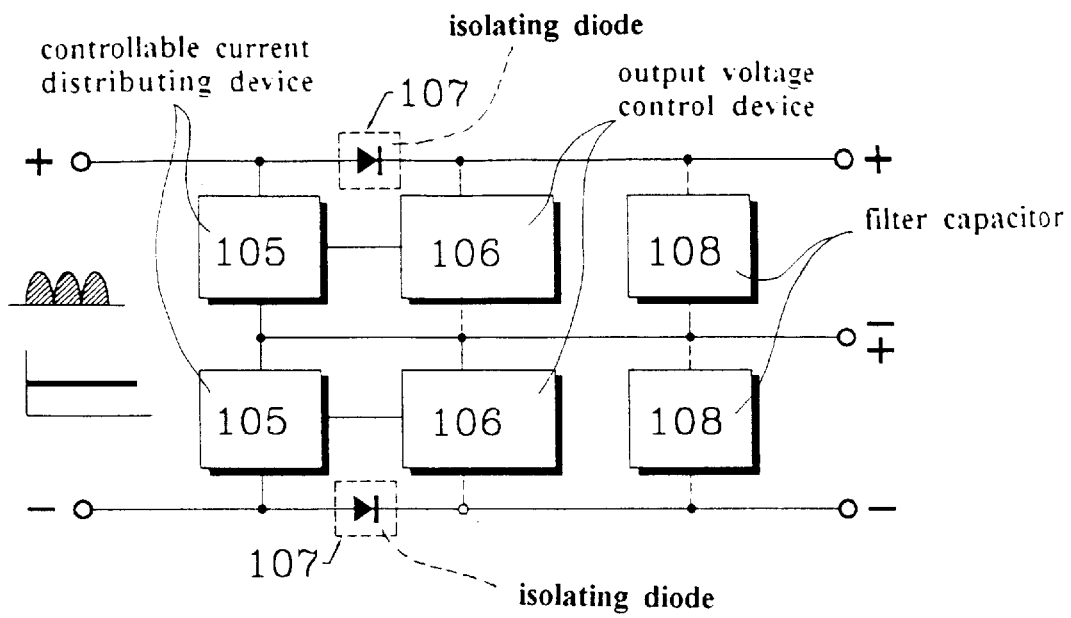
FIG. 20 is the first example of the invention illustrating a multiple voltage tap output circuit.

FIG. 20 is a schematic circuit diagram which shows a twentieth preferred embodiment of the present invention that includes the first example of a capacitor regulated controllable voltage and current power supply circuit illustrating the multiple voltage terminal output circuit. In the embodying example of FIG. 20, a front section current rectifying circuit having a full wave rectified current function is installed, while the two controllable current distributing circuits 105, comprised of two linear or switching type solid state or electromechanical components, are first series connected in a polarity direction, then are parallel connected in a polarity direction, then are parallel connected to the power source. Each circuit is respectively coupled with each individual output control device. The multiple voltage terminals include the series connection point between the aforesaid two controllable current distributing circuits and the positive or negative power source for individual outputs to drive the individual load. Each of the two aforesaid circuits can be series connected to a diode 107 in the current direction between the controllable current distributing device 105 and the output voltage control device, and a second filter capacitor 108 can be selectively parallel connected between the output terminal, as required.

Figure 21:
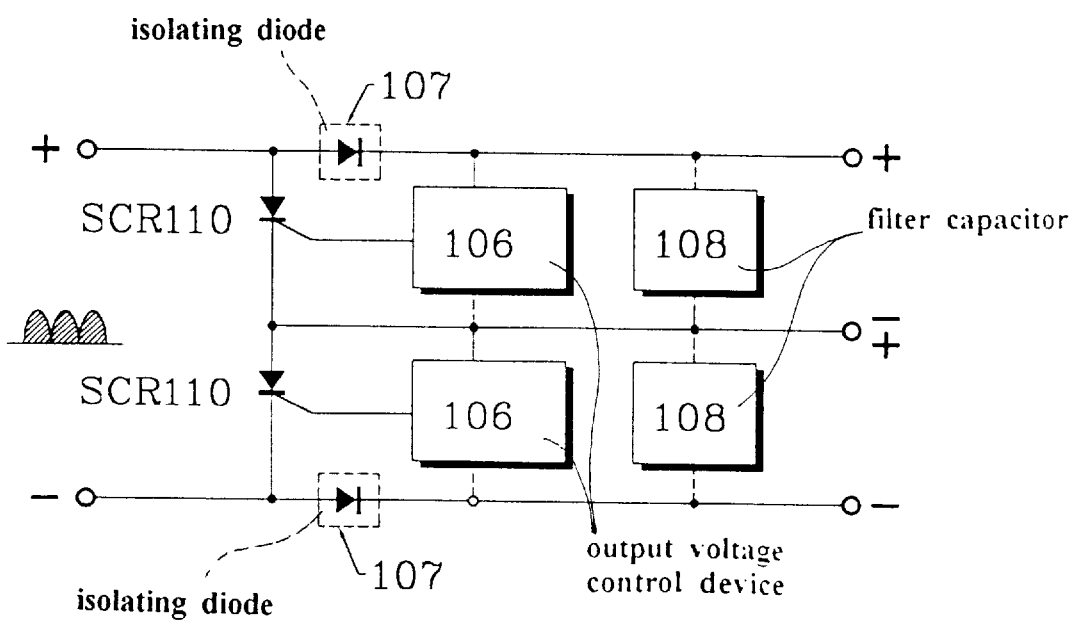
FIG. 21 is the second example of the invention illustrating a multiple voltage tap output circuit.

FIG. 21 is a schematic circuit diagram which shows a twenty first preferred embodiment of the present invention that includes a second example of the capacitor regulated controllable voltage and current power supply circuit, illustrating the multiple voltage terminal output circuit. In the embodying example of FIG. 21, a front section current rectifying circuit with a full wave rectified current function is installed, while the two controllable current distributing circuits 105 including two thyristors SCR110 are first series connected in a polar direction and then are parallel connected to the power source. Each circuit is respectively coupled with each individual output control device 106. The multiple voltage terminals include the series connection point between the aforesaid two controllable current distributing circuits and the positive or negative power source for individual outputs to drive the individual load. Each of the two aforesaid circuits can be series connected to a diode 107 in the current direction between the controllable current distributing device 105 and the output voltage control device, and a second filter capacitor 108 can be selectively parallel connected between the output terminals as required.

Figure 22:
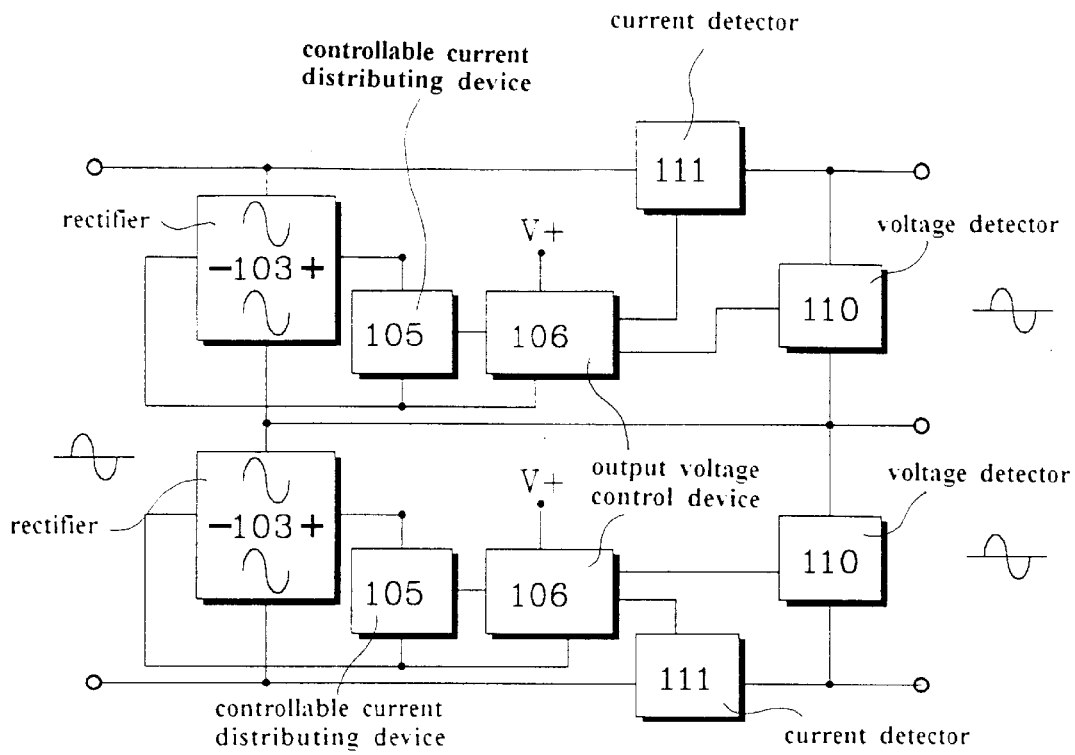
FIG. 22 is the third example of the invention illustrating a multiple voltage tap output circuit.

FIG. 22 is a schematic circuit diagram which shows a twenty second preferred embodiment of the present invention that includes a third example of the capacitor regulated controllable voltage and current power supply circuit illustrating the multiple voltage extractions output circuit. In the embodying example of FIG. 22, the capacitor 101 is series connected to the AC power source 100, whereby the AC terminals of the two full wave bridge type current rectifying device 103 are mutually series connected and then are parallel connected to the output terminals of the AC power source 100. The controllable current distributing device 105 includes each of the two linear or switching type solid state or electromechanical components connected to the positive and negative terminals of the individual bridge type current rectifier device 103 in a polar direction. The output terminals can be selectively series connected to a load current detector device 111 or parallel connected to a load terminal voltage detector device 110 for detecting the relative current or voltage thereby further controlling the output voltage control device 106. The series combining points of the aforesaid two full wave current rectifier device 103 and the two AC power source terminals constitute multiple AC output voltage or current terminals.

The aforesaid embodiments of a capacitor regulated controllable voltage and current power supply circuit with multiple voltage terminals are based on the example of two stage output voltage. In practical applications, two or more than two stage circuits based on the embodying examples described in FIGS. 1–22 can be designed according to the following four principles of the multiple voltage distributing circuit: (1) The voltage stages of the multiple voltage output circuit can be of two stages or more than two stages; (2) same numbers of the controllable current distributing devices 105 can be installed according to voltage stages of the multiple voltage output circuit, wherein their series connection points can be used for multiple voltage output; (3) the same number of voltage control devices 106 can be installed according to voltage stages of the multiple voltage output circuit to individually control the current distributing device 105; and (4) a common output voltage control device can be installed to individually control the controllable current distributing devices 105.

Applications of the capacitor regulated controllable voltage and current power supply circuit with single voltage output or multiple voltage output, may also take into account the following four system considerations. First, the controllable current distributing device 105 can be controlled by the output voltage control device 106 in the following control circuit embodiment types to include fixed bias proportional bias, or phase angle triggering modulation, etc., so that a primary voltage stabilizin circuit between the output voltages can be omitted, thereby allowing the circuit to react with the output voltage variations.

The second system consideration is that the controllable current distributing device 105 can be controlled by the output voltage control device 106 embodiments including a control circuit to include fixed bias, proportional bias, or phase angle triggering modulation, etc., so that a primary voltage stabilizing circuit can be installed between the output voltages to improve the control on the controllable current distributing device affected by the voltage variations.

Figure 23:
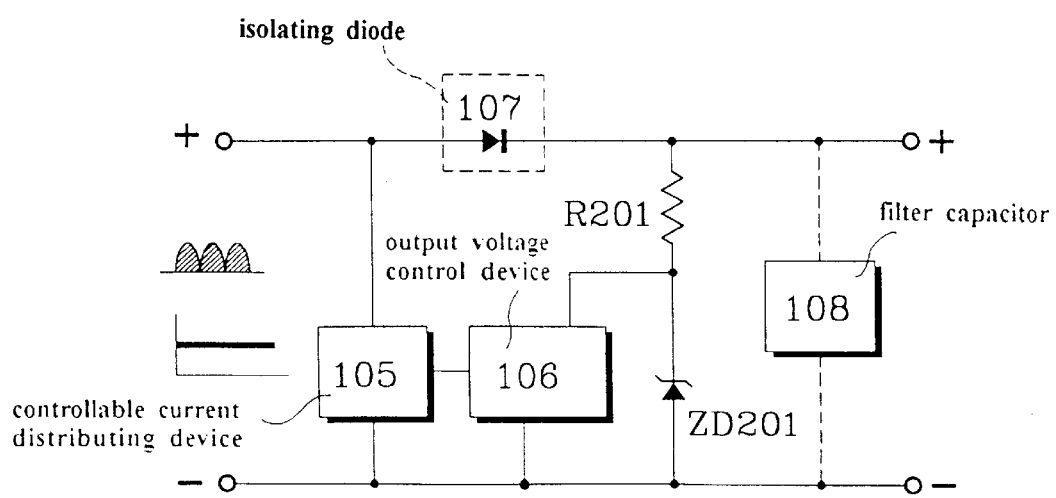
FIG. 23 is a schematic circuit diagram of the invention illustrating a primary voltage stabilizing circuit installed ahead of the output terminals.
Figure 20:
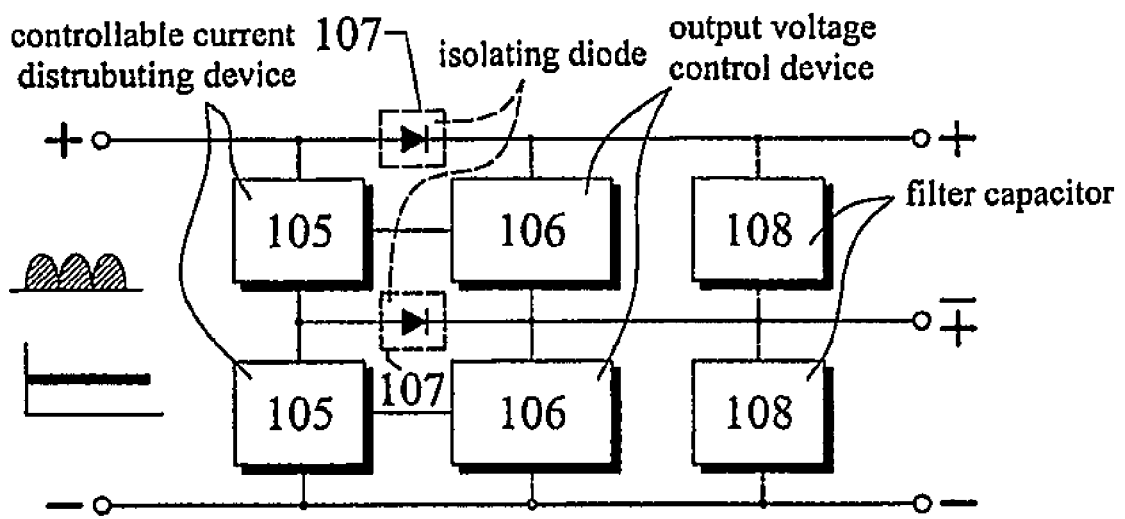
Figure 21:
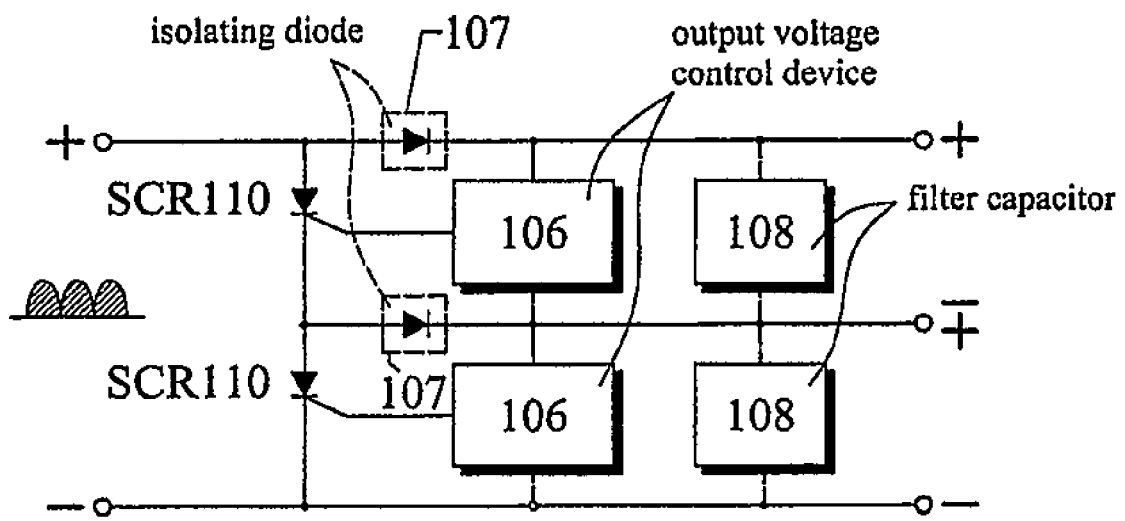

FIG. 23 is a schematic circuit diagram of the capacitor regulated controllable voltage and current power supply circuit illustrating a voltage stabilized circuit installed before the output terminals. The primary voltage stabilizing circuit primarily includes the output voltage stabilizing circuit primarily includes the output voltage control device 106, voltage distributing resistor R201, and the zener diode ZD201 which is parallel connected between the two terminals of the output voltage control device. The aforesaid circuit can be series connected to a diode 107 in the current direction between the controllable current distributing device 105 and the output voltage control device, and a second filter capacitor 108 can be selectively parallel installed between the output terminals, as required.

The third system consideration is that the controllable current device 105 is controlled by the pulse-width output voltage control device CL110 for pulse-width modulation (PWM), and the primary voltage stabilizing circuit between the output voltages can be selected to be installed or not installed.

The fourth system consideration is that the load-side feedback signal is accepted by the output voltage control device 106 to control the current distributing device 105 for providing corresponding distributing current, thereby controlling the terminal voltage or output current.

As summarized from the above description, the invention is a series combination of capacitors and bridge type current rectifier devices to constitute a voltage reducing and current limiting rectifying circuit, together with a controllable current distributing circuit device parallel combined between the output terminals of the current rectifying circuit to actively control the output voltage.

I claim:

1. A capacitor regulated controllable voltage and current power supply comprising:
   a voltage reducing and current limiting rectifying circuit arranged to be connected to an AC power source having one or more phases and AC output terminals, said rectifying circuit including a current rectifier device having rectifier output terminals, said current rectifier device being parallel connected to said AC output terminals;
   a capacitor parallel connected to a resistor and series connected between said AC power source and said current rectifier device;
   a controllable current distributing device for actively controlling output voltage, said controllable current distributing device being parallel connected to said current rectifier device output terminals; and
   a voltage output control device connected to said controllable current distributing device for supplying a control bias voltage to said distributing device, said output voltage control device being arranged to be selectively connected to a control terminal of said controllable current distributing device and including a series connected zener diode and current limiting resistor;
   a diode arranged to be selectively series connected in a current direction between said controllable current distributing device and said output voltage control device; and
   a capacitor arranged to be selectively parallel connected with said load at a point between said output voltage control device said load.

2. The power supply of claim 1, wherein
   said capacitor is series connected between said AC power source and primary windings of a transformer, whereby secondary windings of said transformer are connected to said current rectifier device.

3. The power supply of claim 1, wherein
   said AC power source is connected to primary windings of a transformer and said capacitor is series connected between secondary windings of said transformer and said current rectifier device.

4. The power supply of claim 1, wherein
   said capacitor is series connected between said AC source and primary windings of a transformer, whereby secondary windings of said transformer are respectively connected to diodes to form a full wave current rectifier circuit.

5. The power supply of claim 1, wherein
   said capacitor is three capacitors respectively series connected between three AC output terminals of a three phase AC power source and three input terminals of a three phase full wave current rectifier device.

6. The power supply of claim 1, wherein
   said AC power source is connected to a three phase transformer; and
   said capacitor is three capacitors respectively series connected between three terminals of a secondary winding of said transformer and a three input terminals of a three phase full wave current rectifier device.

7. The power supply of claim 1, wherein
   said current rectifier device is a bridge-type full wave current rectifier device having positive and negative terminals and AC terminals;
   said positive and negative terminals are parallel connected in a current direction to said controllable current distributing device and said voltage output control device, and said AC terminals are parallel connected to said AC output terminals.

8. The power supply of claim 7, wherein
   said AC output terminals are series connected to a load current detector device and parallel connected to a load voltage detector device to control said output voltage control device.

9. The power supply of claim 1, further comprising:
   a second capacitor connected in parallel with said rectifier output terminals between said rectifier output terminals and said controllable current distributing device.

10. The power supply of claim 1, wherein
    said current limiting resistor is parallel connected to said AC terminals and is a variable resistor having a tap terminal for producing a control voltage bias.

11. The power supply of claim 10, wherein said controllable current distributing device includes a thyristor, said thyristor having a control connected to said tap terminal.

12. The power supply of claim 1, wherein said current limiting resistor is a voltage distributing resistor, whereby said voltage distributing resistor has a tap terminal between two series connected resistors parallel connected between the two power source terminals, said tap terminal providing a proportional voltage bias.

13. The power supply of claim 1, wherein a pulse-width modulation voltage output control device is connected to said output voltage control device.

14. The power supply of claim 10, wherein
    said variable resistor is series connected to a phase shifting capacitor and said variable resistor tap produces a phase angle triggering modulation output voltage series connected to a triggering diode that controls said current distributing device.

15. The power supply of claim 1, wherein said
    said voltage output control device is a phase angle triggering modulation output voltage control device including a current limiting resistor, wherein
    said current limiting resistor is parallel connected to said AC terminals and is a variable resistor having a tap terminal for producing a thyristor control voltage bias, and
    said controllable current distributing device includes a thyristor, said thyristor having a control connected to said tap terminal.

16. The power supply of claim 1, further comprising a multiple voltage output circuit including:
    one or more additional controllable current distribution devices series connected in a polarity direction and together parallel connected with said AC output terminals, wherein each said controllable current distribution device is controlled by a respective voltage output control device, and said series connection forms an output voltage terminal.

17. The power supply of claim 1, wherein said one or more controllable current distribution devices is a thyristor.

18. The power supply of claim 1, wherein
    said current rectifier device is one or more bridge-type full wave current rectifier devices each having positive and negative terminals and two AC terminals;
    said positive and negative terminals of each said current rectifier device are parallel connected in a current direction to a respective controllable current distributing device and voltage output control device;

said two AC terminals of each said current rectifier are respectively series connected to load current detector devices and respectively parallel connected to load voltage detector devices to respectively control output voltage control devices, wherein said series connection between current rectifier devices forms an AC voltage output terminal.

19. The power supply of claim 1 further comprising:

a series connected resistor and zener diode parallel connected with load terminals, wherein a tap connected to said series connection is connected to an output voltage control device, thereby conducting a feedback signal to said output voltage control device which controls said current distributing device.

* * * * *

UNITED STATES PATENT AND TRADEMARK OFFICE
CERTIFICATE OF CORRECTION

PATENT NO. : 6,023,419
APPLICATION NO. : 08/986746
DATED : February 8, 2000
INVENTOR(S) : Tai-Her Yang It is certified that error appears in the above-identified patent and that said Letters Patent is hereby corrected as shown below:

Substitute the attached replacement sheet, which includes amended Figs. 20 and 21, for Figs. 20 and 21 of the above-identified patent.

Signed and Sealed this

Second Day of October, 2007

JON W. DUDAS
*Director of the United States Patent and Trademark Office*